Sept. 12, 1950
H. F. KORS
2,521,982
PIECRUST TRIMMING BOARD AND
TRANSFER CLOTH COMBINATION
Original Filed March 9, 1942
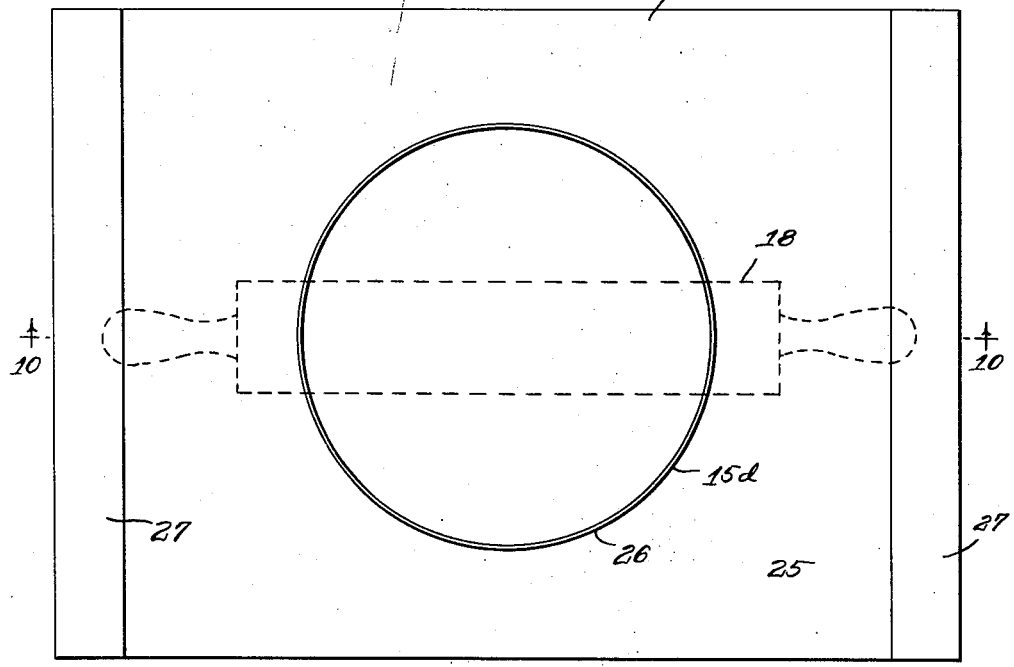
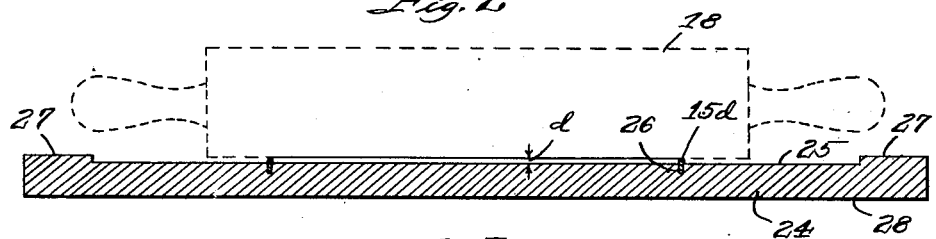
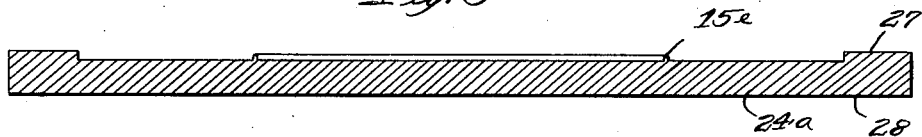
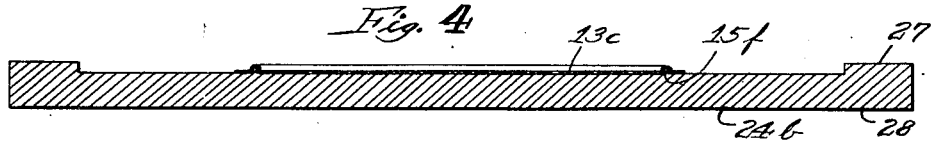
Inventor:
Henry F. Kors
By McCanna, Wintercorn & Morsbach
Attys.

Patented Sept. 12, 1950

2,521,982

UNITED STATES PATENT OFFICE 2,521,982

PIECRUST TRIMMING BOARD AND TRANSFER CLOTH COMBINATION

Henry F. Kors, Chicago, Ill., assignor of one-half to August J. Braun, Chicago, Ill.

Original application March 9, 1942, Serial No. 433,968, now Patent No. 2,355,307, dated August 8, 1944. Divided and this application July 14, 1944, Serial No. 544,928

1 Claim. (Cl. 107—46)

This application is a division of my copending application, Serial No. 433,968, filed March 9, 1942, now U. S. Patent No. 2,355,307 of August 8, 1944.

This invention relates to a new and improved pie-crust trimming board and transfer cloth combination.

In the making of pies at home, the average housewife finds it quite difficult to roll out the dough to the desired size and shape and usually has to resort to patching, with the result that the finished pies do not present a neat and satisfactory appearance. It is, therefore, the principal object of my invention to provide a board including a trimming ring by means of which the housewife can roll out a true disk of dough for the piecrust, to the precise diameter and approximate thickness desired and all guesswork and need for patching is eliminated and no special skill is required.

The dough, in accordance with my invention, is preferably rolled out over a piece of canvas or the like, placed over the trimming ring on the board, so that the trimmed disk of dough is left on the canvas after the rolling operation, and the canvas can be used in picking up the dough and placing it into the tin or over the pie, the canvas being peeled off the back of the dough at that time.

The circular ring, bead or rib provides a pattern for guidance in rolling out the dough in various directions so as to work it into a circular disk form, and the rolling pin riding on the ring so defined rolls the dough to a substantially uniform thickness and any surplus is trimmed off by the ring as the pin rides thereon.

In accordance with the present invention, the trimming ring or bead is incorporated in a breadboard, which has its opposite ends of increased thickness to provide projecting pad portions to support the board when turned upside down for use of the other flat side as a regular bread-board.

The invention is illustrated in the accompanying drawings, in which:

Fig. 1 is a plan view of a combination breadboard and pie-crust trimming ring made in accordance with my invention;

Fig. 2 is a longitudinal section on the line 2—2 of Fig. 1;

Figs. 3 and 4 are sections similar to Fig. 2 but showing still another construction, Fig. 4 differing from Fig. 3 in showing the cloth or canvas covering that is preferably used in combination with the trimming bead on the board.

Similar reference numerals are applied to corresponding parts throughout the views.

In the parent application, I disclosed a substantially circular piece of canvas or other similar flexible material having a trimming ring sewed in the free edge portion to define a circular bead of approximately $\frac{1}{16}$ in. to approximately $\frac{1}{8}$ in. in height to predetermine accordingly the thickness of the dough rolled out. In the present application, the canvas or cloth, as will soon appear, utilizes the circular ring, bead or rib provided on the bread-board and does not, therefore, require the sewing of a ring in the edge portion thereof. In this application, as in the parent application, the diameter of the trimming ring defined on the canvas predetermines the shape and diameter of the disk of dough rolled out and any excess dough is trimmed off by the trimming ring outside the predetermined diameter of the trimming ring. The housewife, in other words, rolls the dough out over the canvas in all directions to fit within the circular trimming ring, and any excess that there may be will be trimmed off more or less automatically as the roller runs over the trimming ring, the excess being left on the outside of said ring. The circular disk of dough can be placed in the pan or over the pie, depending on whether it is destined for the bottom or top crust, and the canvas is peeled off the back thereof.

The dough will be of substantially even thickness and the resulting pie will present a much neater appearance because of the all around uniformity of the crust. All guesswork is eliminated, and there is never any need for patching. Furthermore, no special skill is required in the use of this device, inasmuch as the housewife can easily roll the dough out using the trimming ring as a pattern to guide her in the operation. The handiness of the canvas in acting as a backing or support for the dough is also apparent when it is considered that in many cases when following the old method a properly rolled out piece of dough is distorted or torn in picking it up and transferring it to the pan.

In Figs. 1 and 2 a board 24 is shown, the top surface 25 of which is provided with a pie-crust trimming ring 15d inset in a circular groove 26, the ring 15d being preferably of wood like the board 24, although metal or other material suitable for the purpose may be employed. The opposite ends of the board are of increased thickness to provide projecting pad portions 27 for supporting the board when turned upside down when the other flat side 28 thereof is to be used as a regular bread-board. As shown in Fig. 3, I may provide a board 24a having a ring 15e in the form of a bead made integral with the board, In the use of these boards the dough is, of course, rolled out to the correct thickness directly on the board and trimmed by the rings, the trimmed disk of dough being then peeled off the board. Substantially the same construction is shown in Fig. 4, where the bead 15f is preferably of slightly smaller height than the bead 15e to allow for the use of a pastry canvas or other cloth 13c over the bead, so that the resulting trimmed disk of dough can be readily picked up off the board and transferred to the pie tin. Obviously, this canvas can and will be used with the boards of Figs. 1 to 3 also.

It is believed that the foregoing description conveys a good understanding of the objects and advantages of my invention. The appended claim has been drawn to cover all legitimate modifications and adaptations.

I claim:

A pie-crust rolling and trimming device comprising, in combination, a piece of substantially rigid flat material at least as large as the diameter of the pie-crust dough to be rolled thereon, means on said piece of flat material defining a projecting trimming ring on the top working surface of said material of approximately the thickness and diameter of the pie-crust dough to be rolled and trimmed thereon, and a piece of thin flexible material resting on said first mentioned material large enough in relation to the diameter of the ring so that the marginal edge portions thereof overlap the ring beyond the margins of a disk of dough rolled out in said ring to the approximate thickness and diameter of said ring, said flexible material serving as a backing on which to transfer the rolled out dough to a pie tin after the dough has been rolled to the thickness of the trimming ring and trimmed thereby to the desired diameter.

HENRY F. KORS.

REFERENCES CITED

The following references are of record in the file of this patent:

UNITED STATES PATENTS

| Number | Name | Date |
|---|---|---|
| 781,239 | Staassen | Jan. 31, 1905 |
| 1,702,144 | Weston | Feb. 12, 1929 |

FOREIGN PATENTS

| Number | Country | Date |
|---|---|---|
| 29,295 | Great Britain | Dec. 31, 1904 |